United States Patent Office 3,344,175
Patented Sept. 26, 1967

3,344,175
4,4'-METHYLENEBISCYCLOHEXYLAMINE-CO$_2$ REACTION PRODUCT
James H. Canfield, Anaheim, Calif., assignor to E. I. du Pont de Nemours and Company, Wilmington, Del., a corporation of Delaware
No Drawing. Filed May 22, 1963, Ser. No. 282,222
2 Claims. (Cl. 260—514)

This invention relates to a novel composition and its use as a curing agent for elastomers. More particularly this invention relates to a novel composition and its use to cure fluoroelastomers.

Fluoroelastomers and particularly elastomeric copolymers containing 70–30% by weight of vinylidene fluoride unit and 30–70% by weight of hexafluoropropene units may be cured in a number of ways. Heretofore, a preferred method of curing has been by heating the elastomer with a basic metal oxide and an acyclic alkylenediamine carbamate, such as ethylenediamine carbamate or hexamethylenediamine carbamate. However, there is still need for additional compounds which are curing agents for these fluoroelastomers, which compounds have advantages over the known curing agents in either safety, rate of cure, or both.

It is an object of this invention to provide a novel fluoroelastomer curing agent. Another object is to provide a process for curing fluoroelastomers. A still further object is to provide a fluoroelastomer curing agent which has a reduced tendency to cause premature vulcanization during processing. Other objects will appear hereinafter.

These and other objects are accomplished by the novel composition obtained by reacting carbon dioxide with 4,4'-methylenebiscyclohexylamine. The fluoroelastomers of this invention are cured by the process of blending into a fluoroelastomer copolymer about 2.5 to 25% by weight of the copolymer of a basic metal oxide and at least 1% by weight of the copolymer of the above reaction product and heating the copolymer mixture. The novel curing agent is particularly valuable for curing elastomeric copolymers containing 70–30% by weight of vinylidene fluoride units and 30–70% by weight of hexafluoropropene units.

It is believed that the reaction product exists predominantly as 4-(4-aminocyclohexylmethyl)cyclohexane-carbamic acid, in the form of the zwitterion, although a small amount of the salt of 4,4'-methylenedicyclohexane-carbamic acid with 4,4'-methylenebiscyclohexylamine is possibly present. The reaction product has the empirical formula $C_{14}H_{26}N_2O_2$. For convenience, the reaction product will be referred to hereinafter as 4,4'-methylenebiscyclohexylamine carbamate.

As stated above, the reaction product is prepared by reacting 4,4'-methylenebiscyclohexylamine with carbon dioxide. The diamine is preferably dissolved in a solvent before reacting it with carbon dioxide. Suitable solvents are methanol, ethanol, p-xylene, benzene, hexane, and cyclohexane. The reaction temperature varies between about 0° C. and 100° C., depending on the solvent used. For example, when methanol is used as the solvent, a temperature of about 40° C. is satisfactory. Since the reaction is reversible and higher temperatures favor the decomposition of the reaction product to the amine and carbon dioxide, it is preferred to carry out the reaction at as low a temperature as is practical, such as between 0° and 50° C.

Although only one mole of carbon dioxide per mole of diamine is consumed in the reaction, it is preferred to introduce a molar excess of carbon dioxide into the reaction mixture so as to ensure as complete utilization of the amine as possible.

The reaction is carried out in an open or closed reactor. Atmospheric pressure is usually satisfactory, although higher or lower pressures may be used if desired. The reaction product precipitates from the solvent as it is formed. The precipitate is recovered by filtration from the reaction medium and dried at a temperature below its decomposition temperature and usually not in excess of about 60° C.

The starting material for this preparation, 4,4'-methylenebiscyclohexylamine, is a known compound whose preparation and properties are described in various references. See J. Am. Chem. Soc., 73, 741 (1951), and U.S. Patents 2,494,563, 2,606,925, and 2,606,927. As described in these references, the parent amine exists in three stereoisomeric configurations. The reaction with carbon dioxide does not affect the configuration. However, the recovered carbamate may contain a somewhat different percentage of isomers from that in the parent amine because of differences in solubility of the three isomeric carbamates in the solvent medium. For example, the trans, trans stereoisomer of the carbamate is essentially insoluble in methanol so that the first fraction of solid precipitated from a methanol solution is substantially 100% trans, trans stereoisomer. 4,4'-methylenebiscyclohexylamine carbamate melts with decomposition over a temperature range of 101–165° C. The decomposition point depends on the content in the material of the various stereoisomers. The following decomposition temperatures are observed for materials having varying contents of trans, trans stereoisomer.

| Percent trans, trans stereoisomer: | Decomposition temperature, ° C. |
|---|---|
| 51 | 101–105 |
| 70 | 107–110; 163 |
| 100 | 127–130; 144–154 |

The second temperature given is the decomposition temperature of a small amount of solid material remaining after the first decomposition.

4,4'-methylenebiscyclohexylamine carbamate is useful as a curing agent for fluoroelastomers such as those disclosed in U.S. Patents 2,968,649 and 3,056,767. However, because of its safe processing characteristics, it is a particularly effective curing agent for elastomeric copolymers containing 70–30% by weight of vinylidene fluoride units and 30–70% by weight of hexafluoropropene units. (These copolymers are described in U.S. Patent 3,051,-677.) For example, with the vinylidene fluoridehexafluoropropene copolymer the curing agent unexpectedly affords much greater processing safety than the known hexamethylenediamine carbamate. While ethylenediamine carbamate is also a safe-processing curing agent, 4,4'-methylenebiscyclohexylamine carbamate is, surprisingly, much faster acting and produces well-cured vulcanizates using lower temperatures and shorter times in the press than are required when ethylenediamine carbamate is the curing agent.

The content of stereoisomers in the methylenebiscyclohexylamine carbamate has some effect on the processing safety afforded by the material in curing fluoroelastomers. In general, the processing safety increases as the percentage of trans, trans isomer in the product increases. This is more particularly brought out in Example 3 and 4.

The new composition of this invention may be added to the fluoroelastomer in an amount ranging from 1 to 5 parts per 100 parts of polymer. Less than 1 part does not usually produce a satisfactory cure and more than 5 parts is not needed.

A basic metal oxide is added to the fluoroelastomer to serve as an acid acceptor. Examples of suitable basic metal oxides are magnesia, litharge, zinc oxide, calcium oxide, and mixtures of these metal oxides. Magnesia is the preferred metal oxide. Satisfactory amounts ranging from 2.5 parts to 25 parts by weight per 100 parts of fluoroelastomer. The preferred amount is 15 to 20 parts.

The usual fillers, such as carbon black, silica, whiting, blanc fixe, clays, and diatomaceous earth may be used. Pigments may be incorporated for color effects. Plasticizers may be used. Examples of suitable plasticizers are dioctyl sebacate and tricresyl phosphate. Dyes and other materials conventionally used in processing elastomers may be used if desired.

The curing agent, the metal oxide, and, if desired, other compounding ingredients, are incorporated into the fluoroelastomer by conventional means such as by milling in heavy-duty mixers or the usual rubber milling equipment. The curable composition can be prepared by incorporating the basic metal oxide and novel curing agent into the fluoroelastomer in any order desired. Ordinarily, water-cooled milling equipment is used so that curing or cross-linking temperatures are not reached.

After the fluoroelastomer has been completely compounded, the stock obtained is cured by heating. In general, temperatures of about 100 to 205° C. are used. In order to reach as complete a state of cure as possible, at least the final portion of the curing cycle is carried out in an open oven at about 200 to 205° C. Thin films (for example, about 0.1 inch in thickness) or small articles from which water vapor and other gaseous by-products of the cure can escape may be vulcanized directly this way. However, larger articles of thicker cross-section need a preliminary curing treatment under compression in a mold to develop sufficient cross-links to prevent rupture and sponging from occurring when they are heated in an open oven. Accordingly, the cure is frequently carried out in two stages. In the first stage the elastomer is heated at 150–250° C. in a mold under pressure ("press-cured") for 5 to 60 minutes, depending on the size and thickness of the article involved. The elastomer is then heated in the oven at about 200° C. or above. Usually 8 to 24 hours will give a completely cured product.

Fluoroelastomers cured with the reaction product of this invention have a variety of uses such as for O-rings, hose, wire insulation, packings, seals, and for coated fabrics to be used for fuel cells and diaphragms.

The following examples will better illustrate the nature of the present invention; however, the invention is not intended to be limited to these examples. Parts are by weight unless otherwise indicated.

Example 1

The reaction is carried out in a 3-liter 4-neck round-bottom flask equipped with a stirrer, a thermometer, a gas inlet tube extending to the bottom of the flask, and a gas outlet tube. 525 grams (2.5 moles) of 4,4'-methylenebiscyclohexylamine is dissolved in 1185 grams of anhydrous methanol. The sample of 4,4'-methylenebiscyclohexylamine used has the following content of stereoisomers: 48.3% trans, trans; 43.3% cis, trans; 8.4% cis, cis. 175 grams (4 moles) of solid carbon dioxide is allowed to evaporate slowly from a 1-liter Erlenmeyer flask through the gas inlet into the solution while the solution is stirred and held at about 40° C., with cooling. A white precipitate is formed, which is filtered, washed with methanol, and dried under vacuum at 60° C. for about 16 hours to yield 520 grams of 4,4'-methylenebiscyclohexylamine carbamate.

Analysis of the product shows the following:

Neutralization equivalent: Found: 128; C, percent, 65.9; H, percent, 10.3; N, percent, 12.2. Theory for $C_{14}H_{26}N_2O_2$: 127; C, percent, 66.1; H, percent, 10.2; N, percent, 11.0.

The content of stereoisomers in the carbamate is essentially the same as in the parent amine.

Example 2

The 4,4'-methylenebiscyclohexylamine carbamate prepared in Example 1 is used as the curing agent, in varying amounts, in a copolymer containing, by weight, 60% of vinylidine fluoride units and 40% of hexafluoropropene units. This copolymer is described in Example 11 of U.S. Patent 3,051,677.

Compounding is accomplished on a two-roll mill using the following recipe:

| | Parts by weight |
|---|---|
| Copolymer | 100 |
| Magnesium oxide | 15 |
| Medium thermal carbon black | 20 |
| Curing agent | (1) |

[1] As shown.

The compounded stock is given a preliminary cure by heating under pressure in a hydraulic press for 30 minutes at 163° C. The formed samples are then given a final cure by warming in a circulating air oven at 232° C. for 24 hours.

The tensile properties in this and succeeding Examples are obtained by ASTM Method D 412–61 T. As a measure of processing safety, Mooney scorch data are obtained at 121° C. according to ASTM Method D 1646–61 using the small rotor.

For comparison, a sample is also tested using the above recipe in which the curing agent is hexamethylenediamine carbamate, a known curing agent for fluoroelastomers. It should be noted that 1.25 parts of hexamethylenediamine carbamate corresponds, on a molar basis, to 2.1 parts of 4,4'-methylenebiscyclohexylamine carbamate.

| | Curing agent, parts by weight | | | |
|---|---|---|---|---|
| | 4,4'-methylenebis-cyclohexylamine carbamate | | | Hexa-methylene-diamine carbamate, 1.25 |
| | 1.6 | 2.0 | 2.4 | |
| Mooney scorch: | | | | |
| Minimum value | 47 | 46 | 47 | 35 |
| Minutes to 10 point rise | 22 | 19 | 17 | 12 |
| Tensile properties: | | | | |
| Tensile strength at break, p.s.i. | 2,300 | 2,350 | 2,450 | 2,975 |
| Modulus at 100% elongation, p.s.i. | 400 | 600 | 800 | 510 |
| Elongation at break, percent | 320 | 240 | 210 | 270 |

Example 3

Samples of 4,4'-methylenebiscyclohexylamine and 4,4'-methylenebiscyclohexylamine carbamate are prepared having varying contents of trans, trans stereoisomer. The amine is prepared as described in J. Am. Chem. Soc. 73, 741 (1951). The content of the trans, trans stereoisomer in the diamine is determined by vapor phase chromatography. The amine carbamate is prepared as described in Example 1. Three samples of the parent amine and two samples of the carbamate are tested using the same compounding recipe and testing methods as in Example 2. The stock is press cured for 30 minutes at 163° C. and oven cured for 24 hours at 204° C. To compare the storage stability of the various samples of the compounded stock, Mooney scorch data for each stock are obtained after the compounded uncured stock has stood at about 24° C. for 4 days. The results of the tests are shown in the following table.

| Curing Agent | 4,4'-methylenebiscyclohexylamine | | | | |
| --- | --- | --- | --- | --- | --- |
| | Carbamate | | Parent Amine | | |
| Content of trans, trans isomer, percent | 55-60 | 70 | 30 | 70 | 95 |
| Parts by weight used in recipe | 2 | 2 | 1.6 | 1.6 | 1.6 |
| Mooney scorch: | | | | | |
| Minimum | 40 | 43 | 53 | 53 | 52 |
| Minutes to 10-point rise | 34 | 44 | 10 | 12 | 12 |
| Tensile properties: | | | | | |
| Tensile strength at break, p.s.i. | 2,575 | 1,750 | 2,400 | 2,350 | 2,250 |
| Modulus at 200% elongation, p.s.i. | 1,400 | 1,380 | 1,300 | 1,310 | 1,320 |
| Elongation at break, percent | 330 | 240 | 360 | 330 | 330 |
| Mooney scorch after stock has stood at 24° C. for 4 days: | | | | | |
| Minimum | 41 | 42 | 96 | 82 | 88 |
| Minutes to 10-point rise | 32 | 37 | 4 | 8 | 7 |

From the above table it can be seen that the carbamate of 4,4'-methylenebiscyclohexylamine affords much greater processing safety than the parent amine. Also the compound stock containing the parent amine tends to "bin scorch" as shown by the increased minimum reading and decrease in time required for a 10-point rise after the stock has stood for 4 days. Compounds with such low scorch times have essentially no processing safety. On the other hand, little change in these readings is noted in the case of the compounded stock containing the amine carbamate.

*Example 4*

In this example two different samples of 4,4'-methylenebiscyclohexylamine carbamate containing respectively, about 51% (Sample A) and 100% (Sample B) of trans, trans stereoisomer are used as the curing agent. The compounding recipe is the same as in Example 2, and 1.6 parts of the curing agent is used. The stock is press cured for 30 minutes at 150° C. and oven cured for 24 hours at 204° C. The following table shows the results:

| | A | B |
| --- | --- | --- |
| Percent trans, trans stereoisomer in curing agent | 51 | 100 |
| Mooney scorch: | | |
| Minimum reading | 41 | 48 |
| Minutes to 10-point rise | 27 | (a) |
| Tensile properties: | | |
| Tensile strength at break, p.s.i. | 2,080 | 2,280 |
| Modulus at 200% elongation, p.s.i. | 985 | 1,000 |
| Elongation at break, percent | 330 | 345 | a 3-point rise in 45 minutes.

*Example 5*

Samples of compounded stock are prepared as described in Example 2 using as the curing agent one of the following:

| | Parts by Weight | | |
| --- | --- | --- | --- |
| | A | B | C |
| 4,4'-Methylenebiscyclohexylamine carbamate (containing about 55% trans, trans stereoisomer) | 2 | | |
| Ethylenediamine carbamate (a known curing agent for fluoroelastomers) | | 0.85 | 1 |

In order to have a significant comparison, on a molar basis, smaller amounts of ethylenediamine carbamate are used. (0.85 part and 1 part of ethylenediamine carbamate correspond, on a molar basis, to 2.07 and 2.44 parts of 4,4'-methylenebiscyclohexylamine carbamate, respectively.) Since the slow cure obtained when ethylenediamine carbamate is the curing agent is particularly evident when curing a thick section, the compounded stock is shaped into pellets 0.5 inch thick and 1.13 inch in diameter and cured in a press for 30 minutes at 163° C. and in the oven for 24 hours at 204° C. During the oven cure the pellets in which the ethylenediamine carbamate is the curing agent become porous and unsuitable for use. This shows that the state of cure attained during the press cure is inadequate. The pellets in which the 4,4'-methylenebiscyclohexylamine carbamate is the curing agent cure satisfactorily during the oven cure and have a compression set of 28% when tested by ASTM Method D-395-61, Method B (70 hours at 149° C.).

When pellets are cured in the press for 60 minutes at 177° C. and in the oven for 24 hours at 204° C., a satisfactory cure is obtained in both stocks. However, these conditions (60 minutes at 177° C.) are impractical for factory use. The compression set data obtained from each sample is as follows:

| | A | B | C |
| --- | --- | --- | --- |
| Compression set, percent (70 hours at 149° C.) | 32 | 29 | 31 |

As many widely different embodiments of this invention may be made without departing from the spirit and scope thereof, it is to be understood that this invention is not limited to the specific embodiments thereof except as defined in the appended claims.

What is claimed is:

1. A composition obtained by reacting carbon dioxide with 4,4'-methylenebiscyclohexylamine.
2. A composition as defined in claim 1 particularly suitable for curing vinylidene fluoride/hexafluoropropene copolymer elastomers wherein at least 48.3 percent of the composition is the trans, trans stereoisomer.

References Cited

UNITED STATES PATENTS

| | | | |
| --- | --- | --- | --- |
| 2,933,481 | 4/1960 | Rugg | 260—87.7 |
| 2,979,490 | 4/1961 | West | 260—87.5 |
| 2,983,753 | 5/1961 | Warnant | 260—514 |
| 2,999,109 | 9/1961 | Nobis | 260—514 |
| 3,029,227 | 4/1962 | Robb | 260—77.5 |
| 3,088,930 | 5/1963 | Cain | 260—41 |
| 3,092,605 | 6/1963 | Sterling | 260—41 |

OTHER REFERENCES

Chem. Abstracts, vol. 27, page 23676 (1933).

LORRAINE A. WEINBERGER, *Primary Examiner.*

A. H. BRODMERKLE, *Examiner.*

K. B. CLARKE, R. K. JACKSON, *Assistant Examiners.*